United States Patent [19]

Higgins

[11] 4,293,759
[45] Oct. 6, 1981

[54] ELECTRIC HEATING SYSTEM FOR HEATING THE INTERIOR OF A MOTOR VEHICLE PRIOR TO STARTING

[76] Inventor: Pink M. Higgins, 136 Moore La. 5, Billings, Mont. 59101

[21] Appl. No.: 105,133

[22] Filed: Dec. 19, 1979

[51] Int. Cl.³ .................. H05B 1/02; F02N 17/02; F24H 3/04
[52] U.S. Cl. ................... 219/202; 98/2.05; 98/2.08; 165/41; 191/12.4; 219/203; 219/279; 219/364; 219/370; 237/12.3 A
[58] Field of Search .............. 219/202, 203, 369, 370, 219/279, 364, 205, 208; 191/12.4; 98/2, 2.05, 2.06, 2.08, 2.09; 165/41; 237/12.3 R, 12.3 A

[56] References Cited

U.S. PATENT DOCUMENTS

| | | | |
|---|---|---|---|
| 2,675,588 | 4/1954 | Simons et al. | 219/369 X |
| 2,725,605 | 12/1955 | Haltenberger | 219/202 X |
| 2,819,373 | 1/1958 | Allman | 219/202 |
| 2,827,540 | 3/1958 | Underwood | 219/279 |
| 2,922,290 | 1/1960 | Carraway | 219/279 X |
| 3,221,138 | 11/1965 | Hercher | 219/202 X |
| 3,496,855 | 2/1970 | DeBoer | 219/202 X |
| 3,524,044 | 8/1970 | Liardi | 219/203 |
| 3,594,547 | 7/1971 | Quinn | 219/202 X |
| 3,671,714 | 6/1972 | Charns | 219/203 |
| 3,673,379 | 6/1972 | Eversull | 219/202 |
| 3,870,855 | 3/1975 | Edlund et al. | 219/279 X |
| 4,034,204 | 7/1977 | Windsor et al. | 219/202 X |
| 4,138,177 | 2/1979 | Van Valer | 191/12.4 X |
| 4,209,675 | 6/1980 | Vitale | 219/203 X |

OTHER PUBLICATIONS

"Two Speed Rear Window Defroster and Defogger" J. C. Whitney Co., Catalog 392 B, 1979 p. 64.
"Rear Window Defroster and Defogger Kit," J. C. Whitney Co., Catalog 393 B, Dec. 1979, p. 10.

*Primary Examiner*—A. Bartis
*Attorney, Agent, or Firm*—Kinney, Lange, Braddock, Westman and Fairbairn

[57] ABSTRACT

An electric heating system for heating the passenger compartment and defrosting the windshield and rear window of a motor vehicle prior to starting includes an electric air heater unit fixedly mounted in the vehicle trunk under the conventional horizontal shelf behind the rearmost seat of the vehicle. Air drawn from the trunk by a blower is heated by an electric heater and conveyed upwardly into the interior of the vehicle over the rear window and forwardly toward the windshield. The electric heater and blower are energized from a house power receptacle by a power cord retractable into a storage reel in the trunk beneath the shelf when not in use. The heater and blower are automatically energized at a pre-selected time by a manually settable timer located within the trunk.

The timer motor is continuously energized from the vehicle battery whereby timer operation is independent of whether the power cord is connected to the house power receptacle.

2 Claims, 2 Drawing Figures

U.S. Patent      Oct. 6, 1981      4,293,759
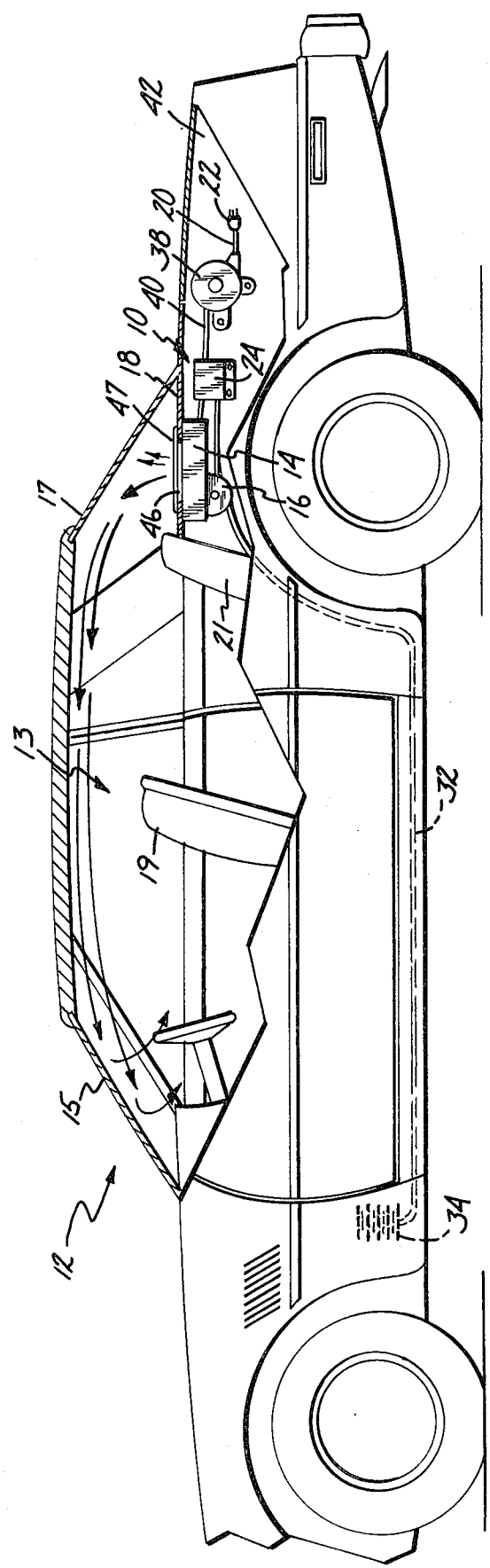
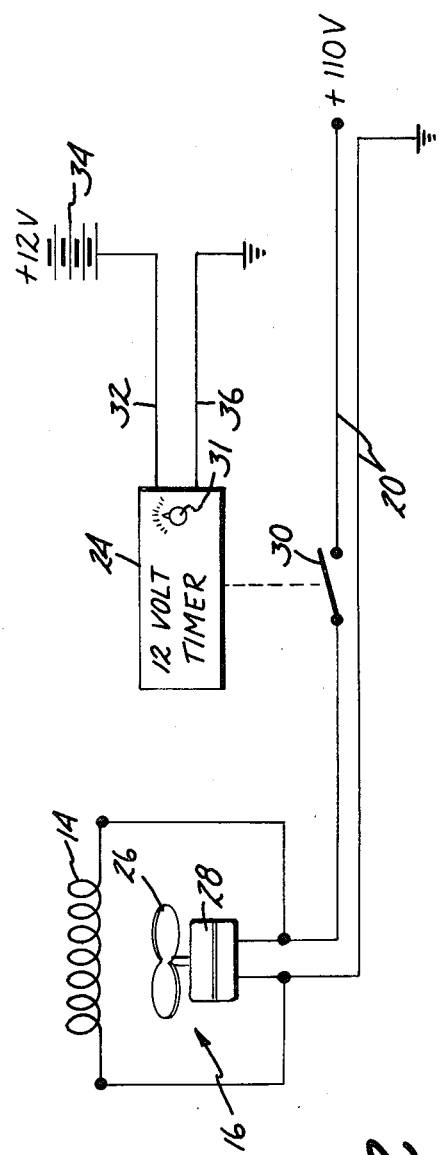

ELECTRIC HEATING SYSTEM FOR HEATING THE INTERIOR OF A MOTOR VEHICLE PRIOR TO STARTING

BACKGROUND OF THE INVENTION

1. Field of the Invention

The present invention relates to motor vehicle heaters and in particular, the present invention relates to motor vehicle heaters that warm the interior of the motor vehicle prior to starting of the car.

2. Description of the Prior Art

In cold weather, the starting of a motor vehicle is an extremely uncomfortable task. Further, when the motor vehicle owner does not own a garage, the windshield of the vehicle commonly has frost or snow from the night before. The frost or snow presents an additional undesirable task that includes cleaning the windshield every morning in the cold. If the windshield is not cleaned properly, the frost or snow present a hazard or danger in driving the vehicle. One solution to the cold and frost and snow is to start the motor vehicle and allow it to run in place, warming the interior and defrosting the windshield from frost or snow. This method, however, is wasteful in that it uses a precious fossil fuel, the price of which keeps escalating. Moreover, this method requires normally getting out to start the car well prior to when it is desired to drive the vehicle.

In the prior art, several patents attempt to provide another solution by prewarming the interior of the motor vehicle without the use of power from the engine. The Allman U.S. Pat. No. 2,819,373 shows an electric heater with a blower mounted in the front portion of the vehicle beneath the dash. Electrical energy is supplied by a detachable cord which is connected to a house current. The electrical power is switched on and off in the house by a switch connected to the cord. The solution of the Allman patent, however, poses a problem for installation in existing cars because of the congestion caused by other devices being beneath the dash and the difficulty of installation through a firewall. Further, one must wait for the interior of the car to be warmed before the windows start to defrost since the air is not directed near any of the windows.

The Hercher U.S. Pat. No. 3,221,138 shows a prestartup car heater that uses house current and is mounted on top of the dash in the interior of the motor vehicle. The Hercher patent solves the installation difficulty due to the congestion beneath the dash but poses a new problem of having a heater mounted on top of the dash, decreasing the amount of viewing area for the driver and presenting a possible safety hazard if a collision occurs. Further, the Hercher patent, like the Allman patent, teaches that the cord providing the electrical house current to the heater is to be installed through the firewall, which is a difficult task.

Two other patents, Eversull U.S. Pat. No. 3,673,379 and Edlund et al. U.S. Pat. No. 3,870,855, show motor vehicle heaters with blowers that use house current to warm the interior of the vehicle prior to starting the vehicle. The Edlund patent teaches a heater mounted in the congested front portion of the vehicle beneath the dash. Both the Edlund and the Eversull patents show heaters that blow directly into the interior of the car, resulting in the interior being warmed before the windows start to defrost.

What is needed is an easily installable car heater that is run by house current to simultaneously pre-warm a vehicle and defrost the windows.

SUMMARY OF THE INVENTION

The present invention includes a heating device for heating the interior of a motor vehicle by mounting the heating device beneath the conventional horizontal shelf found behind the rearmost seat in most vehicles. The heating device includes an electric heater for heating the air and a blower adjacent and beneath the electric heater for conveying the air through the electric heater and into the interior of the motor vehicle, warming the interior and defrosting the windows. A power cord is connected to the electric heater and blower at one end and has a terminal at the other end compatible with a house receptacle.

The power cord is retractable into a reel in the vehicle trunk when not in use. The heater and blower are automatically energized at a preselected time by a manually settable timer located in the vehicle trunk. The timer motor is continuously energized from the vehicle battery so that timer operation is independent of whether the power cord is connected to the house receptacle.

The heating device of the present invention is easily installable in the conventional motor vehicle having a shelf behind the rearmost seat. In the case of a passenger vehicle, the device is installed through the trunk beneath the shelf where there is plenty of room for installation and no obstructing firewall. In many cases, an opening in the shelf will not have to be cut for allowing the heated air to pass into the interior of the vehicle since a rear speaker cutout may already exist.

BRIEF DESCRIPTION OF THE DRAWINGS

FIG. 1 is a side view of a passenger vehicle with portions cut away to display the present invention installed within the passenger vehicle, and FIG. 2 is a schematic diagram of the heating device of the present invention.

DESCRIPTION OF THE PREFERRED EMBODIMENT

The heating device of the present invention, generally indicated at 10, is shown installed in a passenger vehicle 12 in FIG. 1, having a passenger compartment 13, a windshield 15, and a rear window 17. The car has a front seat 19 and a rear seat 21. Disposed between the rear seat 21 and the bottom of rear window 17 is the conventional horizontal rear shelf 18. An electric heater 14 with a blower 16 is mounted beneath the conventional rear shelf 18. A cord 20 is conductively connected to the heater 14 and blower 16 at one end and has a terminal 22 at the other end compatible with a house receptacle (not shown). A timer switch 24 conductively interrupts the connection between the conductive cord 20 and the electric heater 14 and blower 16.

The diagram shown in FIG. 2 shows an electrical schematic diagram of the heating device. The heater 14 is conductively connected to the blower 16, preferably in parallel. The blower 16 includes a fan 26 and an electric motor 28 for driving the fan. The blower 16 and the electric heater 14 are conductively connected to the cord 20 which supplies conventional alternating current power such as 110 volt a.c. A timer switch 24 is connected to interrupt the conductive connection between the blower 16 and the heater 14 and the cord 20. The timer switch 24 is a conventional electric motor operated timer switch having an electrical motor (not shown) for actuating a switch 30 through a suitable gear train and controlled by one or more knobs 31. The switch 30 is connected into the conductor 20 to interrupt the flow of current therethrough when the switch is open. The timer switch 24 has one end external lead 32 conductively connected to the positive terminal of the car battery 34 and the other external lead 36 is conveniently grounded at any point of the vehicle's chassis. Leads 32 and 36 are connected to the electric motor of the timer 24 under the control of a switch actuated by knob 31. Preferably the car battery is a 12 volt battery and thus the motor timer switch is of the type which is designed for energization by a 12 volt source.

The timer switch 24 is a manually settable switch that preferably runs on a continuous basis off the car battery. The timer switch may be any commercially available type which allows the time of day and the time at which the switch 30 will complete the circuit to be set by the vehicle operator through actuation of one or more knobs 31. The timer switch should preferably be a 24 hour switch minimizing the number of times the vehicle operator needs to set it.

The conductive cord 20 is preferably stored in a reel type storage device 38, as shown in FIG. 1. The storage reel 38 is preferably attached to the inside of the trunk of the car 12. The reel 38 allows the cord 20 to be pulled out of the trunk and attached to a house receptacle with the terminal 22. When disengaged from the receptacle, the reel 38 will automatically retract the cord within itself. Such reels customarily have sliding electrical connections between the conductor 20 that is pulled out of the reel and the relatively stationary conductor 40 leading to the time switch 24. Typical retractable reels of this type are shown in U.S. Pat. Nos. 3,826,879 and 4,138,177.

The heater device of the present invention is easily installed in a conventional motor vehicle that has a shelf 18 behind the rearmost seat 21. The device 10 is installed through the trunk 42 of the vehicle 12. The trunk 42 is not separated from the interior 44 by a firewall which eliminates one of the greatest difficulties found in installing heaters in the front portion of a vehicle. The heater and blower are secured to the underside of shelf 18 by any conventional method such as screw threaded fasteners.

The heater will preferably have an upwardly projecting portion 46 which extends through the opening in the shelf. If the shelf 18 has a rear speaker cutout, the removal of this cutout will provide the opening through which portion 46 can extend. If the shelf 18 does not have a rear speaker cutout, then an aperture must be cut to provide the opening for portion 46. This is not a difficult task since most rear shelves are made of extremely thin material which is easily cut. The heater preferably has a grill 47 at the top and the heater air can pass outwardly through this grill.

Timer 24 and the reel 38 are attached to any convenient wall in the trunk 42. The timer 24 may be conveniently grounded within the interior of the trunk and the lead 32 to be connected to the positive terminal of the battery 24 is preferably routed underneath the chassis or underneath the floor covering as shown by the broken line in FIG. 1.

With the heater 14 and the blower 16 mounted beneath the shelf in the trunk area, the heated air circulates from the rearward portion of the interior of the motor vehicle to the front portion as indicated by the arrows in FIG. 1. The heated air, as it initially enters the interior 13 of the motor vehicle 12, passes next to the rear windshield 17, defrosting the windshield. The air circulation continues along the roof line up to the front windshield, defrosting that windshield also. In this manner the interior and the front and rear windshields are both defrosted.

The operation of the present invention is easily accomplished. The power cord 20 is pulled from its storage in reel 38 from within the trunk 42 and terminal 22 is plugged into a house receptacle. The timer 24 is checked to ensure that it corresponds to the proper time of day and then is set for the time desired to supply power to the blower 16 and the heater 14. This time should be sufficiently prior to entry of the motor vehicle in the morning for the drive to work that the front and rear windows will be defrosted. When the set time is reached, the heater 14 and the blower 16 will turn on and heat the interior 13 of the car and defrost the rear windshield 17 as described previously. The vehicle operator, when ready to leave, merely pulls the cord 22 from the house receptacle and allows the reel 38 to pull the cord 20 back into its storage position. The operator of the vehicle may now enter into a comfortable and warm car with a minimal amount of scraping snow or frost on a cold day.

CONCLUSION

The heating device of the present invention is easily installable underneath the horizontal shelf behind the rearmost seat, an uncongested area. The device will then heat the interior of the vehicle and defrost the front and rear windows prior to starting the car engine. Although the present invention has been described with reference to the preferred embodiment, persons skilled in the art will recognize that changes may be made in form and detail without departing from the spirit and scope of the invention.

What is claimed is:

1. In a motor vehicle having a passenger compartment with at least one seat, a windshield, a rear window, a trunk, a battery and a horizontal shelf behind the rearmost seat over the trunk, the improvement comprising a heating system for heating the passenger compartment and defrosting the rear window and windshield of the vehicle prior to starting, said heating system including:

an electric air heater means fixedly mounted under and to the horizontal shelf for heating air, said air heater having an air outlet in the shelf and an air inlet communicating with the interior of the trunk;

a blower means also positioned underneath the shelf for conveying air through the electric heater means from the trunk and upwardly through the air outlet into the interior of the motor vehicle over the rear window;

a conductive power cord conductively connected to the electric heater means and blower means at one end and having a terminal at another end compatible with a conventional electrical receptacle external of the vehicle for energizing said heater means and said blower from ordinary commercial power of approximately 110 volts, said power cord being retractable into a storage reel in the trunk beneath the horizontal shelf when not in use;

a manually settable timer switch mounted in the trunk beneath said shelf, and including a switch for interrupting the connection between the conductive cord and the electric heater means and blower means, said timer switch having an electric motor for driving the same, and permanent electrical connections between the battery of the vehicle and the timer motor to cause the timer motor to run continuously regardless of whether the vehicle is in use or not whereby the operation of the timer motor is independent of whether the power cord is connected to a commercial power source or not.

2. The device of claim 1 wherein the horizontal shelf has a factory formed speaker aperture and the electric heater means and blower means are mounted directly beneath and within the speaker aperture to allow the heated air to pass through said aperture to the interior of the motor vehicle.

* * * * *